United States Patent
Shimoda et al.

(10) Patent No.: US 10,504,359 B2
(45) Date of Patent: Dec. 10, 2019

(54) WIRELESS CONTROL SYSTEM INITIATED BY POWER GENERATION

(71) Applicant: ABLIC Inc., Chiba-shi, Chiba (JP)

(72) Inventors: Sadashi Shimoda, Chiba (JP); Yusuke Takeuchi, Chiba (JP); Taro Yamasaki, Chiba (JP)

(73) Assignee: ABLIC INC., Chiba (JP)

(*) Notice: Subject to any disclaimer, the term of this patent is extended or adjusted under 35 U.S.C. 154(b) by 0 days.

(21) Appl. No.: 16/145,965

(22) Filed: Sep. 28, 2018

(65) Prior Publication Data

US 2019/0103015 A1 Apr. 4, 2019

(30) Foreign Application Priority Data

Sep. 29, 2017 (JP) ................. 2017-191134

(51) Int. Cl.
*G08C 17/02* (2006.01)
*H02S 40/30* (2014.01)
*H01M 6/04* (2006.01)
*H01M 8/16* (2006.01)

(52) U.S. Cl.
CPC .............. *G08C 17/02* (2013.01); *H02S 40/30* (2014.12); *H01M 6/04* (2013.01); *H01M 8/16* (2013.01)

(58) Field of Classification Search
None
See application file for complete search history.

(56) References Cited

U.S. PATENT DOCUMENTS

| 6,259,372 B1 | 7/2001 | Taranowski et al. |
| 2017/0126281 A1* | 5/2017 | Cook ..................... H02J 5/005 |
| 2018/0152100 A1 | 5/2018 | Utsunomiya et al. |

FOREIGN PATENT DOCUMENTS

| JP | 2000-222668 A | 8/2000 |
| JP | 2018-085888 A | 5/2018 |

* cited by examiner

*Primary Examiner* — Daniell L Negron
(74) *Attorney, Agent, or Firm* — Brinks Gilson & Lione

(57) ABSTRACT

There is provided a wireless control system which has a node apparatus including a power generating device, a capacitor and a voltage conversion circuit device connected to the power generating device, and a wireless device having a transmitter function, and connected to the voltage conversion circuit device; a gateway device having a transceiver function of transmitting and receiving a wireless signal transmitted from the node apparatus; and a server device connected to the gateway device, and further has a receiving device which receives a signal transmitted from the gateway device having the transceiver function, and an actuator operated by a signal sent from the receiving device, and in which power with which the node apparatus operates is supplied from the power generating device, and the power generated in the power generating device is increased and decreased by the actuator.

6 Claims, 4 Drawing Sheets

WIRELESS CONTROL SYSTEM INITIATED BY POWER GENERATION

RELATED APPLICATIONS

This application claims priority under 35 U.S.C. § 119 to Japanese Patent Application No. 2017-191134 filed on Sep. 29, 2017, the entire content of which is hereby incorporated by reference.

BACKGROUND OF THE INVENTION

1. Field of the Invention

The present invention relates to a wireless control system initiated by power generation.

2. Description of the Related Art

There has been known a failure detection device which converts energy generated by vibrations into electrical power by an energy converter and stores the electrical power therein, and performs wireless transmission of a vibration state to the outside by the stored electrical energy (refer to, for example, Japanese Patent Application Laid-Open No. 2000-222668).

In the related art failure detection device, an alarm is only generated even at an occurrence of abnormality.

SUMMARY OF THE INVENTION

According to one aspect of the present invention, there is provided a wireless control system including: a node apparatus including: a power generating device, a capacitor and a voltage conversion circuit device connected to the power generating device, and a wireless device configured to transmit a first wireless signal, and connected to the voltage conversion circuit device; a gateway device configured to receive the first wireless signal transmitted from the node apparatus and transmit a second wireless signal; and a server device connected to the gateway device, a receiving device configured to receive the second wireless signal transmitted from the gateway device, and an actuator configured to move by a signal sent from the receiving device, and in which the power generating device generates and supplies power with which the node apparatus operates, and in which the actuator increase or decreases the power generated in the power generating device.

According to the present invention, there can be constructed a wireless control system which performs control of a power generating device according to the state thereof without depending on only alarm generation.

DETAILED DESCRIPTION OF THE PREFERRED EMBODIMENTS

A wireless control system according to embodiments of the present invention will hereinafter be described with reference to the accompanying drawing.

Figure 1:
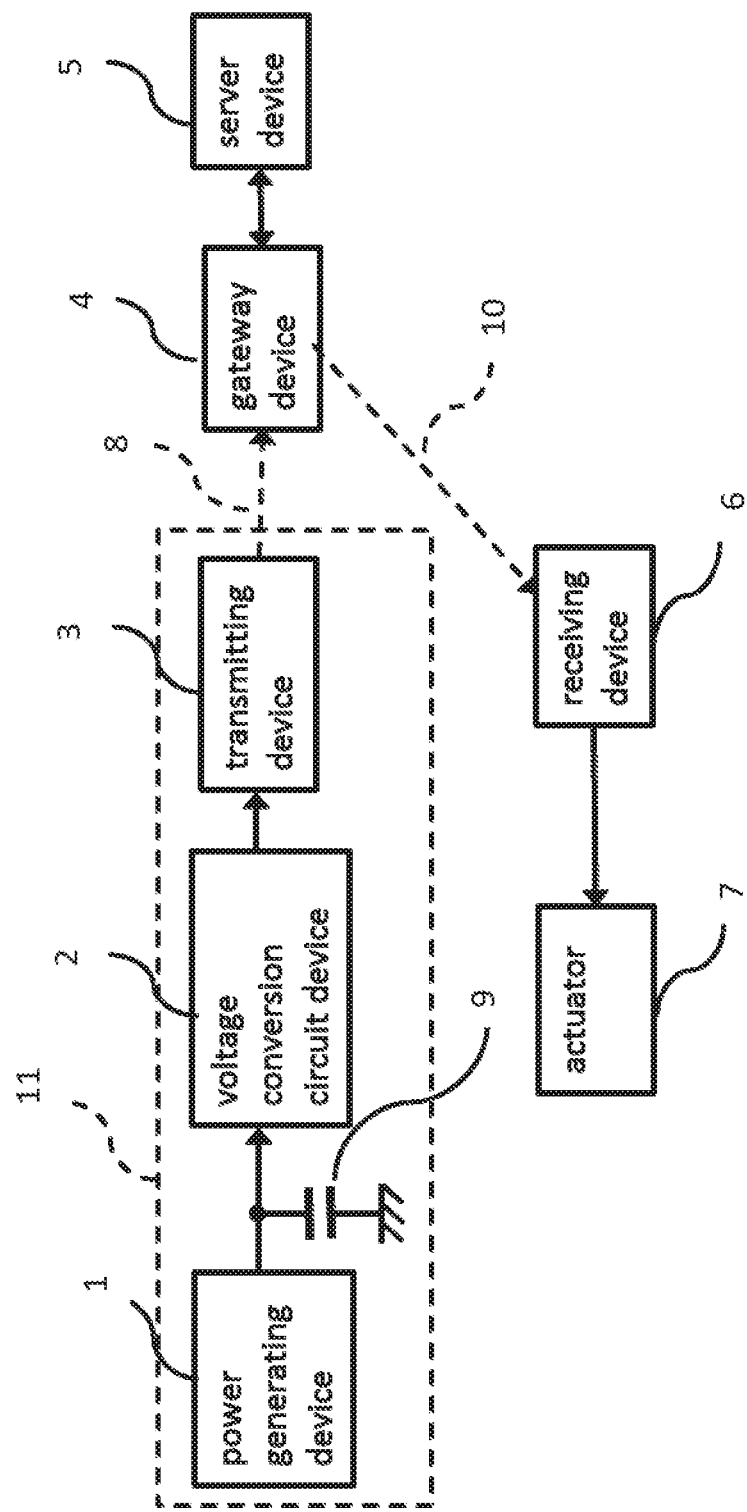
FIG. 1 is a functional block diagram illustrating an example of a wireless control system according to the present invention.

FIG. 1 is a functional block diagram illustrating an example of a wireless control system according to the first embodiment of the present invention.

The wireless control system according to the present embodiment includes a node apparatus 11 equipped with a power generating device 1, a capacitor 9, a voltage conversion circuit device 2, and a transmitting device 3, a gateway device 4, a server device 5, a receiving device 6, and an actuator 7.

The power generating device 1 is composed of different kinds of metals. For example, it has been widely known that electrical power is generated by an oxidation-reduction reaction. Specifically, the combination of two different metals and an electrolytic solution forms a battery. At this time, the metal having a large ionization tendency, i.e., which is more negative in standard electrode potential, serves as a negative electrode, whereas the metal having a small ionization tendency, i.e., which is more positive in standard electrode potential, serves as a positive electrode.

Further, as the difference between the standard electrode potentials of the two metals becomes large, the electromotive force (voltage obtainable from the outside) of the battery becomes large. For example, lemon battery uses copper and zinc, zinc serves as a negative electrode, and copper serves as a positive electrode. Its electrolytic solution is lemon juice. Further, in a voltaic battery, zinc serves as a negative electrode, copper serves as a positive electrode, and its electrolytic solution is dilute sulfuric acid.

Here, since the standard electrode potential of zinc is −0.762V, and the standard electrode potential of copper is +0.342V, a potential difference of about 1V occurs. This is a theoretical electromotive voltage of the voltaic battery. When water is used as an electrolyte, the voltage obtainable from the outside, however, becomes lower than 1V due to a voltage drop by the internal resistance, although an electromotive force is generated in the same principle, since the internal resistance of water as an electrolytic solution is large. Specifically, the voltage drops to a voltage about 0.3V.

The voltage conversion circuit device 2 has a function of converting the low voltage generated in the power generating device 1 into a higher voltage. This conversion is normally called a boosting operation, and is realized by the use of a charge pump circuit, a DC/DC converter circuit or the like. Thus, the low voltage is boosted to a voltage of about 2V.

The voltage boosted to about 2V is applied to the transmitting device 3 to serve as a power supply. This transmitting device 3 is constructed from a device which adopts wireless communication systems based on widely-used BLE (Bluetooth (Registered Trademark) Low Energy) wireless device or sub-GHz wireless device or the like. So long as the voltage conversion circuit device 2 can boost the voltage of the power generating device 1 to about 2V since the lowest operation voltage of the wireless device which adopts these systems is about 2V, the transmitting device 3 can operate by this voltage. Specifically, presence of water between the different metals of the power generating device 1 generates the voltage as described above. On the contrary absence of the electrolytic solution such as water between the different metals generates no voltage.

First Embodiment

Figure 2:
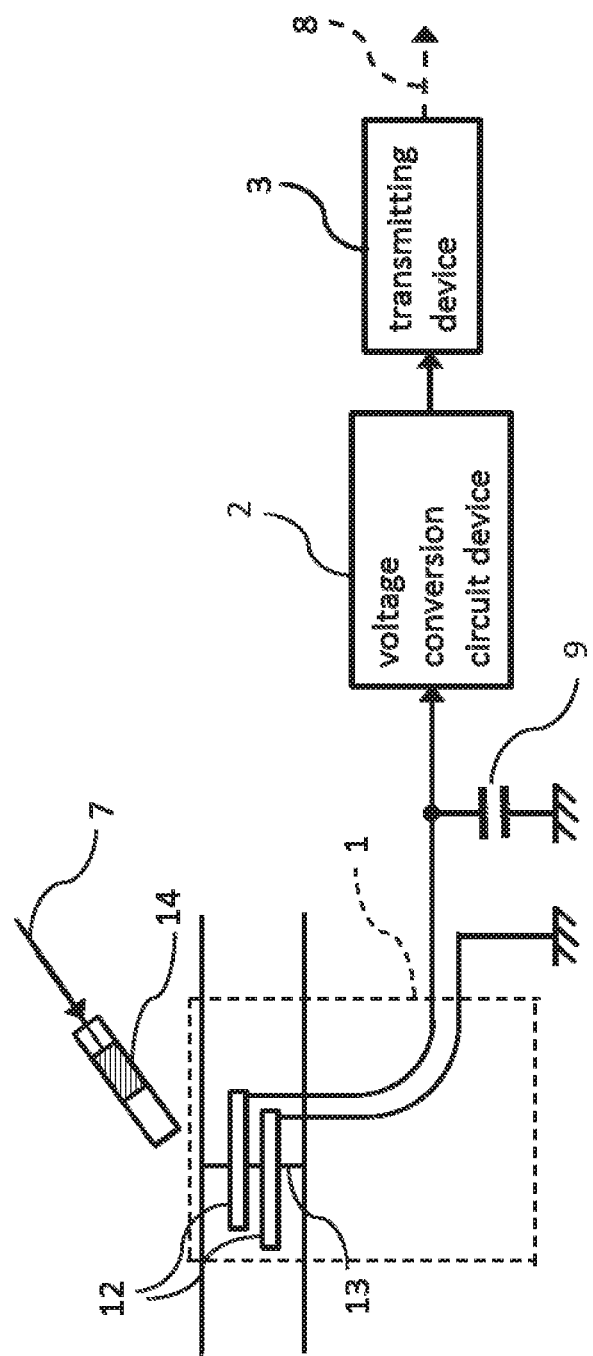
FIG. 2 is a drawing illustrating the first embodiment according to the present invention.

The first embodiment according to the present invention will be described based on FIG. 2 in which a power generating device 1 and an actuator 7 are specifically shown. As shown in FIG. 2, electrodes 12 of the different metals of the power generating device 1 are separated by a prescribed distance and embedded into a material easy to absorb moisture, such as cloth or paper, and then formed into a tape-like shape in opposition to each other. The different metals formed in the tape-like shape are installed by a method such as wrapping around a joint 13 of piping in a factory. The power generating device 1 does not generate a voltage at absence of water leakage from the joint 13 of piping. At presence of the water leakage from the joint 13 of piping due to its aging or the like, the water exists between the different metals of the power generating device 1, and the voltage of about 0.3V is generated as described above by the oxidation-reduction reaction. That is, it is possible to convert the presence/absence of the water leakage into the voltage. Ideally, at absence of the water leakage, the output of the power generating device 1 is 0V, whereas at presence of the water leakage, the output of the power generating device 1 is 0.3V.

If the water leakage is present, the need for a repair must be transmitted to a factory manager by some means. Since the output voltage of the power generating device 1 can be boosted to 2V or so by the voltage conversion circuit device 2 when the output voltage is equal to or greater than 0.3V, the transmitting device 3 can be driven utilizing this voltage. Thus, if the factory manager is nearby, it is possible to directly notify the fact of water leakage to a cellular phone or the like of the factory manager by wireless signal. Further, since the amount of water leakage is equal to the amount of the electrolytic solution, the larger the water leakage, the greater the amount of power generation. The term "greater" in the above description means that the transmission interval of a wireless signal transmitted from the transmitting device 3 is short. That is, since the transmission interval of the wireless signal is inversely proportional to the amount of water leakage, the transmission interval of the wireless signal indicates the degree of the water leakage. At this time, an identification number of the transmitting device 3 is assigned to signal data 8 being the wireless signal transmitted from the transmitting device 3 to thereby make it possible to identify from which joint of the piping water is leaking, in case the power generating device 1 is arranged in plural within the factory.

Further, since the power generating device 1 is arranged in the piping, the power generating device 1, the voltage conversion circuit device 2, and the transmitting device 3 may preferably be integrated as the node apparatus 11.

The signal data 8 being the wireless signal transmitted from the transmitting device 3 is received by the gateway device 4. The data received by the gateway device 4 is further transferred to the server device 5. The role of the server device 5 is to accumulate the transferred data and at the same time analyze the data and feedback some operation. As an example of the role, against water leakage from a joint 13 of the piping, an actuator 7 close to a water leakage spot is operated to apply a repairing material 14 disposed close to the joint 13 of the piping onto a water leakage portion. Besides, the reception interval of the signal data 8, the position of node apparatus 11 and the start time of its arrangement, etc. are accumulated in the server device 5, and their data are analyzed to thereby predict the degree of water leakage, the location where the water leakage is liable to occur, the time necessary for maintenance of the piping, etc., whereby information useful for the piping maintenance can be obtained.

In order to enable this operation, a command signal 10 is provided from the server device 5 to the actuator 7, specifically, the command signal 10 is transmitted to the receiving device 6 through the gateway device 4 to operate the actuator 7. That is, it is possible to produce a series of flow in which the signal sensed in the power generating device 1 by the present wireless control system is transferred to the server device 5 through the gateway device 4, and thereby suitable action is performed by the actuator 7.

Here, the actuator 7 has the function of automatically applying the repairing material 14 disposed close to the joint 13 of the piping to the water leakage portion. Thus, the water leakage is automatically stopped. After the water leakage is stopped, the moisture between the two different metals of the power generating device 1 gradually evaporates, and the output voltage of the power generating device 1 becomes zero after a while. In this state, the node apparatus 11 is not capable of transmitting wireless signal. Consequently, the factory manager can recognize the stop of water leakage. That is, the actuator 7 operates to stop the water leakage and reduce power generated for the water leakage by the power generating device using the above oxidation-reduction reaction.

Further, the features of the present system reside in that it is not necessary for the power generating device 1, the voltage conversion circuit device 2, and the transmitting device 3 to have a power supply for operating them. The power supply is generated by the power generating device 1 composed from the different metals according to the oxidation-reduction reaction. The voltage conversion circuit device 2 and the transmitting device 3 are driven by the supply of the power generated herein.

Thus, the power consumption of the voltage conversion circuit device 2 and the transmitting device 3 must be lower than the power generated in the power generating device 1. This is unrealistic. This is because the power generated in the power generating device 1 has a voltage of 0.3V and a current of about 3 μA, and the resulting power is about 1 μW. On the other hand, the power consumption of the transmitting device 3 is about 30 mW. As means for realizing it, the capacitor 9 is thus arranged. That is, an element for providing a power of 30 mW with a power generation of 1 μW is the capacitor 9.

An energy of 30 mW×1 msec=30 μWsec is required to operate the transmitting device 3 requiring a power of 30 mW for 1 msec, whereas in order to collect this energy by the power generating device 1, energy must be accumulated in the capacitor 9 for 30 μWsec/1 μW=30 sec.

As described above, if even the small power of 1 μW is accumulated in the capacitor 9 over the time of 30 seconds, it can be converted into energy which enables the transmitting device 3 to operate for a short time of 1 msec. The time of 1 msec is a time sufficient for the transmitting device 3 to transmit the wireless signal. However, in the above argument loss is not assumed to be present for simplification of their description. Since the loss due to the voltage conversion actually exists in the voltage conversion circuit device 2 or the like, the above time duration exceeds 30 seconds.

Once the signal is transmitted from the transmitting device 3, the electric charge of the capacitor 9 is discharged by the transmission power consumed in the transmitting device 3. As a result, since the voltage of the capacitor 9 falls below the minimum operation voltage of the transmitting device 3, the transmission thereof stops. However, since the electromotive force is generated by reaction in the battery by the oxidation-reduction reaction at the output of the power generating device 1 if the water from the leakage still exists between the different metals of the power generating device 1, accumulation of the electric charge is continued in the capacitor 9. By repeating this operation, ideally, the transmitting device 3 is capable of transmitting a wireless signal to the gateway device 4 every 30 seconds.

Second Embodiment

Figure 3:
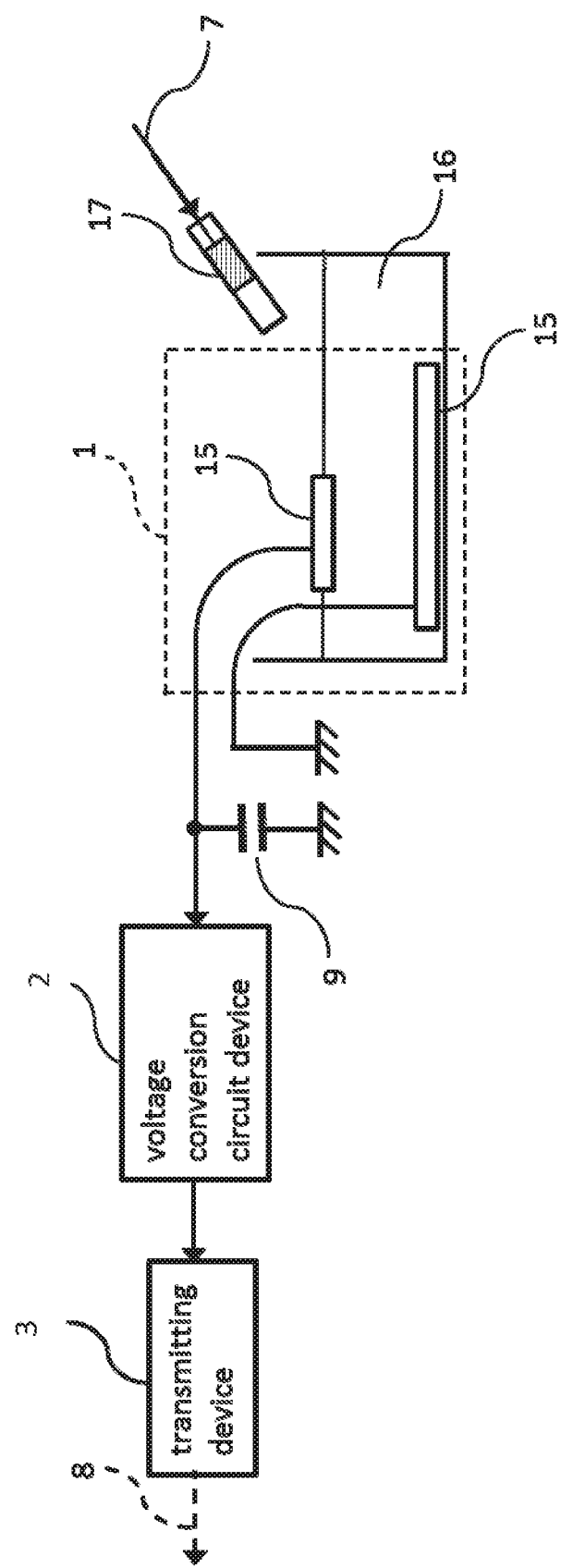
FIG. 3 is a drawing illustrating the second embodiment according to the present invention.

The second embodiment according to the present invention will be described based on FIG. 3 in which a power generating device 1 and an actuator 7 are specifically shown. A power generating device 1 is composed from current generating bacteria and two electrodes 15 consisting of iron oxide or the like. Here, the current generating bacteria are bacteria which decompose an organic matter such as sugar, acetic acid or the like to emit electrons. The *Shewanella* bacterium has been known as a typical current generating bacterium. A "microbial fuel cell" using the current generating bacteria can be expected to have practical application. The *Shewanella* bacterium is a bacterium which exists everywhere such as in the ground, in water or the like all over the place. The current generating bacterium obtains energy necessary for its own growth by decomposing an organic matter and discarding electrons. Electrons generated at this time are collected in an electrode 15 and taken out as a current.

There can be constructed, for example, a system of performing photosynthesis of a rice plant to produce an organic matter from the root thereof and causing bacteria to generate a current by using the organic matter. The current generating bacteria utilize iron oxide taken therein and decompose the organic matter to discard electrons. The discarded electrons are collected in an electrode 15 and taken out as a current. For example, a container with an electrode 15 laid in the bottom thereof is filled with liquid containing acetic acid as an organic matter and potting soil 16 is added to feed the current generating bacteria. After a little while, the current begins to decrease, but the current flows again if an organic matter such as acetic acid as a feed is added.

In the power generating device 1, the two electrodes 15 made of iron oxide are arranged in the potting soil 16 with current generating bacteria and acetic acid. There is provided a voltage conversion circuit device 2 having a function of converting a low voltage across the electrodes 15 which is generated in the power generating device 1 to a higher voltage. This conversion is normally called a boosting operation, and for its realization there is known a charge pump circuit or the like. Thus, the low voltage is boosted to a voltage of about 2V.

The voltage boosted to about 2V is applied to the transmitting device 3 to serve as a power supply therefor. This transmitting device 3 is constructed from a device which adopts wireless communication systems based on widely-used BLE (Bluetooth (Registered Trademark) Low Energy) wireless device or sub-GHz wireless device or the like. So long as the voltage conversion circuit device 2 can boost the voltage of the power generating device 1 to about 2V since the lowest operation voltage of the wireless device which adopts these systems is about 2V, the transmitting device 3 can operate by this voltage. Specifically, if the current generating bacteria of the power generating device 1 are active, the voltage is generated. On the contrary the voltage is hardly generated unless the current generating barium is active.

That is, the activity of the current generating bacteria can be converted into voltage. If the current generating bacteria are inactive, the output of the power generating device 1 is about 0V, whereas if the current generating bacteria are active, the output of the power generating device 1 is about 0.5V.

If the current generating bacteria are inactive, the need for activation of the current generating bacteria must be transmitted to a system manager by some means. Since the output voltage of the power generating device 1 can be boosted to 2V or so by the voltage conversion circuit device 2, the transmitting device 3 can be driven utilizing this voltage if the output voltage of the power generating device 1, i.e., the output voltage of the current generating bacteria contained in the soil 15 is 0.5V. Thus, if there is the system manager nearby, a signal is directly and regularly received by a cellular phone or the like of the system manager. Since the amount of power generation is large if the current generating bacteria are active, the cycle of the signal is short. That is, it is possible to notify that the soil 16 is active in a short cycle. Further, when the cycle of the signal is long to the contrary, it is possible to notify that the soil 16 is inactive. That is, the cycle of the signal represents the activity of the soil 16. Further, the ID of the transmitting device 3 is assigned to signal data 8 transmitted from the transmitting device 3 to thereby make it possible to identify which soil of position is active, in case the power generating device 1 is arranged in plural within the soil.

Further, given that the power generating device 1 is arranged in the soil 16, the power generating device 1, the voltage conversion circuit device 2, and the transmitting device 3 may preferably be integrated as a node apparatus 11.

The signal data 8 sent from the transmitting device 3 is received by a gateway device 4. The gateway device 4 has a time stamp function, and the received time is added to the signal data 8. Further, the signal data 8 is transferred to a server device 5. The role of the server device 5 is to accumulate the transferred data and at the same time analyze the data, and feedback some operation. In the case of soil power generation, for example, the role is to give an alarm to a manager or automatically spray a solution such as acetic acid for activating the current generating bacteria to the soil 16. Besides, the reception interval of the signal data 8, the position of node device 11 and the start time of its arrangement, etc. are accumulated in the server device 5, and their data are analyzed to thereby predict the activity of the soil 16, quality of the location for activity, the time necessary for spraying of the solution, etc., whereby information useful for maintenance of the soil power generation can be obtained.

In order to enable this operation, a command signal 10 is provided from the server device 5 to the actuator 7, specifically, the command signal 10 is transmitted to a receiving device 6 through the gateway device 4 to operate the actuator 7. That is, the signal sensed in the power generating device 1 by the present wireless control system is transferred to the server device 5 through the transmitting device 3 and the gateway device 4. The actuator 7 is operated by a command 12 sent again to the receiving device 6 through the gateway device 4 after suitable processing is determined by the server device 5 to thereby make it possible to produce a series of flow in which the suitable processing is performed.

Here, the actuator 7 has the function of a pump to automatically inject acetic acid 17 into the soil 16. Thus, acetic acid injected as described above increases the activity of the current generating bacteria to thereby activate the soil 16. However, as time passes, the effect of acetic acid reduces so that the soil 16 becomes inactivated. Then, the possible amount of power generation from the power generating device 1 reduces, and the output voltage of the power generating device 1 becomes zero after a while. In this state, the node apparatus 11 is not capable of transmitting wireless signal. Thus, the server device 5 recognizes the inactivation of the soil 16 and operates the actuator 7 through the gateway device 4 and the receiving device 6. The actuator 7 operates to activate the soil 16 by the injection function of acetic acid 17 or the like and increase power generation by the current generation bacteria in the power generating device 1.

Further, the feature of the present system resides in that the power generating device 1, the voltage conversion circuit device 2, and the transmitting device 3 are not required to have a power supply for operating them. The power supply is generated by the current generation bacteria in the power generating device 1 formed from two or more metals such as iron oxide. The voltage conversion circuit device 2 and the transmitting device 3 are driven by the supply of the power generated herein.

Thus, the power consumption of the voltage conversion circuit device 2 and the transmitting device 3 must be lower than the power generated in the power generating device 1. This is unrealistic. This is because the power generated in the power generating device 1 has a voltage of 0.5V and a current of about 60 $\mu$A, and the resulting power is about 30 $\mu$W. On the other hand, the power consumption of the transmitting device 3 is about 30 mW. As means for realizing it, a capacitor 9 is thus arranged. That is, an element for providing a power of 30 mW with a power generation of 30 $\mu$W is the capacitor 9.

An energy of 30 mW×1 msec=30 $\mu$Wsec is required to operate the transmitting device 3 requiring the power of 30 mW for 1 msec, whereas in order to collect this energy by the power generating device 1, energy must be accumulated in the capacitor 9 for 30 $\mu$Wsec/30 $\mu$W=1 sec.

As described above, if even a small power of 1 $\mu$W is accumulated in the capacitor 9 over the time of 1 second, it can be converted into energy which enables the transmitting device 3 to operate for a short time of 1 msec. The time of 1 msec is a time sufficient for the transmitting device 3 to transmit the wireless signal. However, in the above argument loss is not assumed to be present for simplification of their description. Since the loss due to the voltage conversion actually exists in the voltage conversion circuit device 2 or the like, the above time duration exceeds 1 second.

Once the signal is transmitted from the transmitting device 3, the electric charge of the capacitor 9 is discharged by the transmission power consumed in the transmitting device 3. As a result, since the voltage of the capacitor 9 falls below the minimum operation voltage of the transmitting device 3, the transmission thereof stops. However, since the electromotive force is generated at the output of the power generating device 1 if the current generating bacteria are still active between the different metals of the power generating device 1, accumulation of the electric charge is continued in the capacitor 9. By repeating this operation, ideally, the transmitting device 3 is capable of transmitting a wireless signal to the gateway device 4 every 1 second.

Third Embodiment

Figure 4:
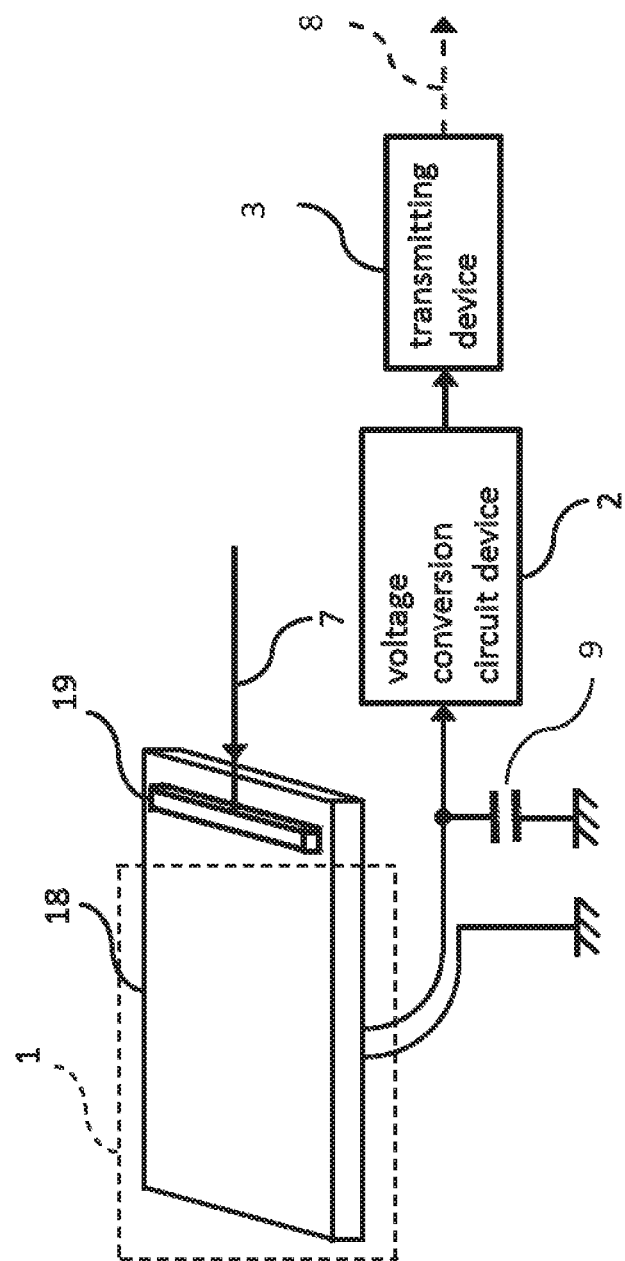
FIG. 4 is a drawing illustrating the third embodiment according to the present invention.

The third embodiment according to the present invention will be described based on FIG. 4 in which a power generating device 1 and an actuator 7 are specifically shown. The power generating device 1 of the present wireless control system has been described specifically by taking the power generating device utilizing the oxidation-reduction reaction and the power generating device using the current generating bacteria. The present invention can be applied even to a power generating device constructed from a solar cell or the like being a photoelectric conversion element using the band gap of a semiconductor for its operation principle. The present embodiment will be descried here using the solar cell 18. A solar cell 18 composed of one cell has an output voltage of 0.5V or less which is an unutilized energy. Even such low energy can be utilized to operate an electronic device by the use of the present wireless control system.

There is provided a voltage conversion circuit device 2 which has a function of converting such a low voltage generated in the power generating device 1 composed of the solar cell 18 having at least one cell into a higher voltage. This conversion is normally called boosting operation, and for its realization there is known a charge pump circuit or the like. Thus, the low voltage is boosted to a voltage of about 2V.

The voltage boosted to about 2V is applied to a transmitting device 3 to serve as a power supply therefor. This transmitting device 3 is constructed from a device which adopts wireless communication systems based on widely-used BLE (Bluetooth (Registered Trademark) Low Energy) wireless device or sub-GHz wireless device, or the like. So long as the voltage conversion circuit device 2 is capable of boosting the voltage of the power generating device 1 to about 2V since the lowest operation voltage of the wireless device which adopts these systems is about 2V, the transmitting device 3 can operate by this voltage. Specifically, if the solar cell 18 of the power generating device 1 is exposed to light, the voltage is generated. Otherwise in reverse, the voltage is little generated.

That is, the presence or absence of light falling on the solar cell 18 can be converted into a voltage. If the solar cell is not active (hereinafter a state of light falling on the solar cell is called active), the output of the power generating device 1 is about 0V, whereas if it is active, the output of the power generating device 1 is 0.5V or so.

If the solar cell 18 is not active, the need for activation of the solar cell 18 must be transmitted to a system manager by some means. Since the output voltage of the power generating device 1 can be boosted to 2V or so by the voltage conversion circuit device 2 if the output voltage the power generating device 1 is 0.5V, the transmitting device 3 can be driven utilizing this voltage. At this time, the ID of the transmitting device 3 is assigned to signal data 8 transmitted from the transmitting device 3 to thereby make it possible to identify which locations are active when the power generating device 1 is arranged in plural within its site.

Further, the power generating device 1, the voltage conversion circuit device 2, and the transmitting device 3 are easy to handle when these devices are integrated as a node apparatus 11.

The signal data 8 transmitted from the transmitting device 3 is received by a gateway device 4. The data received by the gateway device 4 is further transferred to a server device 5. The role of the server device 5 is to accumulate the transferred data and at the same time analyze the data, and feedback some operation. In the case of solar power generation, for example, it is possible to take actions such as giving an alarm to a nearby manager via a smartphone, or directing a panel toward the sun for the purpose of automatically activating the solar cell 18. Besides, the reception interval of the signal data 8, the position of its arrangement, the start time of its arrangement, etc. are accumulated in the server device 5, and their data are analyzed to thereby predict the activity of the solar cell 18, quality of the location for activity, the time necessary for cleaning, etc., whereby information useful for maintenance of solar cell power generation can be obtained.

In order to enable this operation, a command signal 10 is provided from the server device 5 to an actuator 7, specifically, the command signal 10 is transmitted to a receiving device 6 through the gateway device 4 to operate the actuator 7. That is, the signal sensed in the power generating device 1 by the present wireless control system is transferred to the server device 5 through the gateway device 4 to thereby make it possible to produce a series of flow to perform suitable processing by the actuator 7. Here, the actuator 7 has a cleaning function 19 of cleaning the surface of the solar cell 18, for example. When the surface of the solar cell 18 gets dirty due to dust in the atmosphere, the output voltage of the solar cell 18 is obviously lowered. As a result, the electric charge accumulated in the capacitor 9 is reduced, and a charge accumulation time taken up to a voltage at which a wireless signal can be transmitted becomes long. Consequently, a transmission interval of the wireless signal becomes long. Contrary, if the surface of the solar cell 18 is clean and is in a sufficient power generation state, the transmission interval of the wireless signal becomes short. That is, the transmission interval of the wireless signal represents the surface state of the solar cell 18. When the transmission interval of the wireless signal becomes longer than a prescribed time, the surface of the solar cell 18 can be cleaned by the operation of the actuator 7. The actuator 7 operates to clean the surface of the solar cell 18 as the solar-cell cleaning function 19 and increase power generated by the power generating device utilizing the band gap of the semiconductor.

The feature of the present system resides in that the power generating device 1, the voltage conversion circuit device 2, and the transmitting device 3 are not required to have a power supply for operating them. The power supply is generated by the power generating device 1 composed from the solar cell 18 having one cell. The voltage conversion circuit device 2 and the transmitting device 3 are driven by the power supply generated herein.

Thus, the power consumption of the voltage conversion circuit device 2 and the transmitting device 3 must be lower than the power generated in the power generating device 1. This is unrealistic. This is because the power generated in the power generating device 1 has a voltage of 0.5V and a current of about 60 µA in a 3 cm square Si-solar cell under a illuminance of 500 lux, and the resulting power is about 30 µW. On the other hand, the power consumption of the transmitting device 3 is required to be about 30 mW. As means for realizing it, a capacitor 9 is thus arranged. That is, an element for providing a power of 30 mW with a power generation of 30 µW is the capacitor 9.

An energy of 30 mW×1 msec=30 µWsec is required to operate the transmitting device 3 requiring the power of 30 mW for 1 msec, whereas in order to collect this energy by the power generating device 1, energy must be accumulated in the capacitor 9 for 30 µWsec/30 µW=1 sec.

As described above, if even a small power of 1 µW is accumulated in the capacitor 9 over the time of 1 second, it can be converted into energy which enables the transmitting device 3 to operate for a short time of 1 mSec. The time of 1 msec is a time sufficient for the transmitting device 3 to transmit the wireless signal. However, in the above argument loss is assumed to be present for simplification of their description. Since the loss due to the voltage conversion actually exists in the voltage conversion circuit device 2 or the like, the above time duration exceeds 1 second.

Once the signal is once transmitted from the transmitting device 3, the electric charge of the capacitor 9 is discharged by the transmission power consumed in the transmitting device 3. As a result, since the voltage of the capacitor 9 falls below the minimum operation voltage of the transmitting device 3, the transmission thereof stops. However, since the electromotive force is generated at the output of the power generating device 1 if the solar cell 18 of the power generating device 1 is still active, accumulation of the electric charge continues in the capacitor 9. By repeating this operation, ideally, the transmitting device 3 is capable of transmitting a wireless signal to the gateway device 4 every 1 second.

Incidentally, although the present embodiment has been described herein by taking for example the photoelectric conversion element, it can be configured as a similar wireless control system if there is provided an element such as a thermoelectric conversion element which converts a physical quantity into power.

What is claimed is:

1. A wireless control system comprising:
    a node apparatus comprising:
        a power generating device,
        a capacitor and a voltage conversion circuit device connected to the power generating device, and
        a wireless device configured to transmit a first wireless signal, and connected to the voltage conversion circuit device;
    a gateway device configured to receive the first wireless signal transmitted from the node apparatus and transmit a second wireless signal;
    a server device connected to the gateway device;
    a receiving device configured to receive the second wireless signal transmitted from the gateway device; and
    an actuator configured to operate by a signal sent from the receiving device,
    the power generating device generating and supplying power with which the node apparatus operates, and
    the actuator increasing or decreasing the power generated in the power generating device.

2. The wireless control system according to claim 1, wherein the power generating device is a power generating device which generates power by an oxidation-reduction reaction caused by water leakage, and
    wherein the actuator stops the water leakage to reduce the power generated in the power generating device.

3. The wireless control system according to claim 1, wherein the power generating device is a power generating device which generates power by current generating bacteria, and
    wherein the actuator controls an activity of the current generating bacteria to increase and decrease the power generated in the power generating device.

4. The wireless control system according to claim 1, wherein the power generating device is a power generating device which generates power by a photoelectric conversion element, and wherein the actuator controls a state of the photoelectric conversion element to increase the power generated in the power generating device.

5. The wireless control system according to claim 1, wherein the power per time generated in the power generating device is smaller than power per time consumed by the node apparatus.

6. The wireless control system according to claim 1, wherein a transmission cycle of the first wireless signal transmitted from the node apparatus is controlled by an amount of the power generated in the power generating device.

* * * * *